(12) United States Patent
Du et al.

(10) Patent No.: US 11,509,143 B2
(45) Date of Patent: Nov. 22, 2022

(54) VIRTUAL INVERTER CONTROLLER FOR A NANOGRID AND THE NANOGRID THEREOF

(71) Applicant: Siemens Aktiengesellschaft, Munich (DE)

(72) Inventors: Feng Du, Shanghai (CN); Wei Gang Chen, Shanghai (CN); Zhen Liu, Shanghai (CN); Yue Zhuo, Beijing (CN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 16/958,246

(22) PCT Filed: Dec. 28, 2018

(86) PCT No.: PCT/EP2018/097103
§ 371 (c)(1),
(2) Date: Jun. 26, 2020

(87) PCT Pub. No.: WO2019/129864
PCT Pub. Date: Jul. 4, 2019

(65) Prior Publication Data
US 2020/0403414 A1 Dec. 24, 2020

(30) Foreign Application Priority Data
Dec. 29, 2017 (CN) .......................... 201711484131.1

(51) Int. Cl.
*H02J 3/00* (2006.01)
*H02J 3/14* (2006.01)
*H02J 3/38* (2006.01)

(52) U.S. Cl.
CPC ........... *H02J 3/388* (2020.01); *H02J 2203/20* (2020.01)

(58) Field of Classification Search
CPC .............................. H02J 3/388; H02J 2203/20
USPC ........................................................... 307/31
See application file for complete search history.

(56) References Cited

U.S. PATENT DOCUMENTS

| | | |
|---|---|---|
| 2004/0021470 A1 | 2/2004 | Adams et al. |
| 2009/0319093 A1 | 12/2009 | Joos et al. |
| 2011/0115301 A1 | 5/2011 | Bhavaraju et al. |

FOREIGN PATENT DOCUMENTS

| | | |
|---|---|---|
| CN | 103887811 A | 6/2014 |
| FR | 2996373 A1 | 4/2014 |

OTHER PUBLICATIONS

International Search Report and Written Opinion dated Apr. 1, 2019.

*Primary Examiner* — Rexford N Barnie
*Assistant Examiner* — Dru Parries
(74) *Attorney, Agent, or Firm* — Harness, Dickey & Pierce, P.L.C.

(57) ABSTRACT

A nanogrid and a virtual inverter controller for the nanogrid are disclosed. The nanogrid includes at least one parallel branch, and at least one branch is equipped with a protector. At least one of the protectors is equipped with one virtual inverter controller. The virtual inverter controller includes a sensor component configured to detect at least one characteristic parameter on the branch, and a control component affecting the electrical connection state of the corresponding protector of the virtual inverter controller according to the characteristic parameter.

14 Claims, 5 Drawing Sheets

VIRTUAL INVERTER CONTROLLER FOR A NANOGRID AND THE NANOGRID THEREOF

PRIORITY STATEMENT

This application is the national phase under 35 U.S.C. § 371 of PCT International Application No. PCT/EP2018/097103 which has an International filing date of Dec. 28, 2018, which designated the United States of America and which claims priority of Chinese Patent Application CN201711484131.1, filed Dec. 29, 2017, the entire contents of each of which are hereby incorporated by reference herein, in the entirety and for all purposes.

FIELD

Embodiments of the present invention generally relate to a virtual inverter controller for a nanogrid and a nanogrid equipped with such a controller.

BACKGROUND

A microgrid can comprise a plurality of nanogrids, wherein each nanogrid is a small power generation and distribution system comprising a distributed power supply, an energy storage device, an energy conversion device, a related load, and a monitoring and protection device. A nanogrid usually refers to a grid which provides a power level of less than 100 kW and is equipped with a distributed power supply. The nanogrid usually operates in grid-connected mode in which it is connected to a conventional large power grid or commercial power grid, or in island mode, in which it is disconnected from a large power grid. There are usually a plurality of parallel branches in the nanogrid, and each branch is equipped with a protector, usually including a miniature circuit breaker (MCB). When the nanogrid operates in grid-connected mode, the internal protectors can usually satisfy the requirements.

FIG. 1 is a schematic diagram for a typical nanogrid 1. The nanogrid 1 comprises n parallel branches (not completely shown in the figure). Each branch is equipped with an MCB as a protector. Of course, only some branches are equipped with a protector in some cases. When the nanogrid 1 operates in island mode (for example, when the branch 30 malfunctions at F2), the response speed of the protector 33 on the branch 30 is always lower than the internal protection speed of an inverter I11, I21 on a branch equipped with the inverter. Since the protector never trips in time, the operation of the whole nanogrid is stopped. Again for example, when a malfunction occurs at F3, if it is expected that the whole nanogrid can still operate, then the protector 13 on the branch 10 should trip ahead of the protector 23 on the branch 20 and the self-protection of the battery storage inverter I21 on the branch 20. However, the prior art cannot satisfy this requirement.

SUMMARY

An embodiment of the present invention first provides a virtual inverter controller for a nanogrid, wherein the nanogrid comprises at least one parallel branch and at least one branch of the branches is equipped with a protector. At least one of the protectors is equipped with one virtual inverter controller. The virtual inverter controller comprises a sensor component capable of detecting at least one characteristic parameter on the branch, and a control component affecting the electrical connection state of the corresponding protector of the virtual inverter controller according to the characteristic parameter. The sensor component can detect the characteristic parameters such as voltage, current and/or frequency on the branch. By setting the virtual inverter controller comprising the sensor component and the control component, the corresponding protector can be controlled, for example, the protector trips before the inverter starts the protection. Usually, a plurality of branches are equipped in a nanogrid, and each branch is usually equipped with a protector. According to the present invention, a virtual inverter controller can be provided for one or more of these protectors.

Another embodiment of the present invention provides a nanogrid, wherein the nanogrid comprises at least one parallel branch, at least one branch of the branches being equipped with a protector, and at least one of the protectors being equipped with the virtual inverter controller described in any of the above-mentioned embodiments.

BRIEF DESCRIPTION OF THE DRAWINGS

The following drawings are only used to give an exemplary description and explanation of the present invention, but are not used to limit the scope of the present invention. Among the drawings.

DESCRIPTION OF REFERENCE NUMBERS IN THE DRAWINGS

Figure 1:
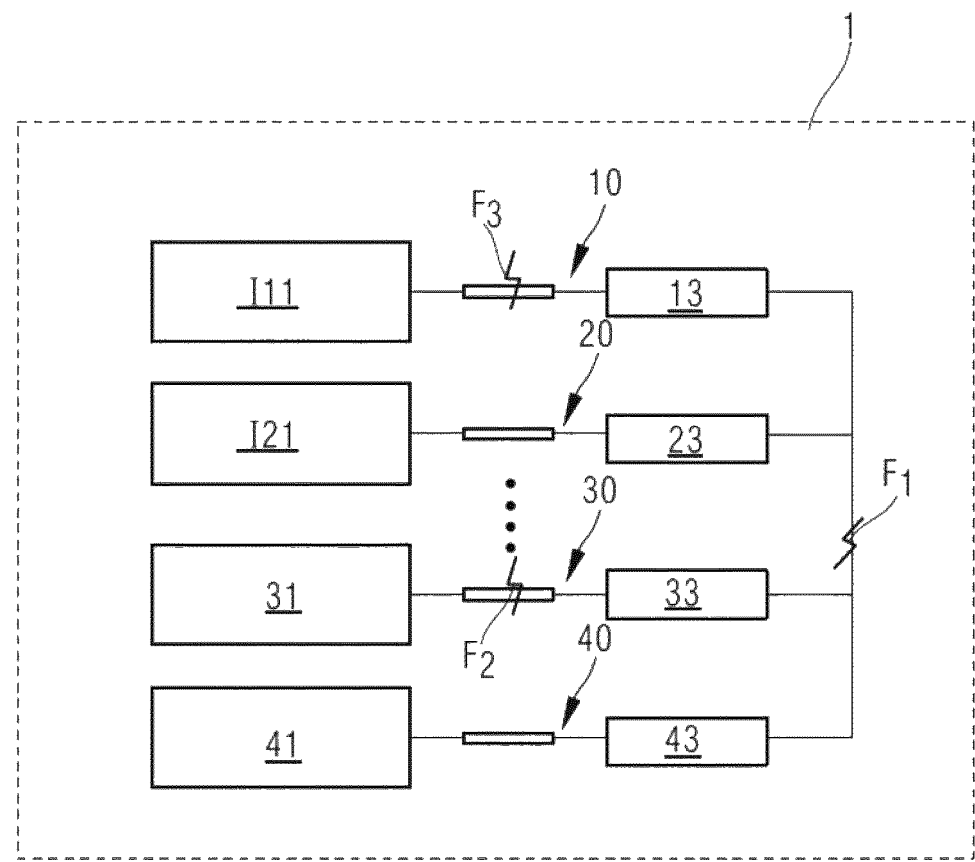
FIG. 1 shows a nanogrid in the prior art.

1 Nanogrid
10 First branch
I11 First inverter
13 First protector
20 Second branch
I21 Second inverter
23 Second protector
30 Third branch
31 Load
33 Third protector
40 Fourth branch
41 Load
43 Fourth protector
100 First virtual inverter controller
200 Second virtual inverter controller
300 Third virtual inverter controller
VIC Virtual inverter controller
SEN Sensor component
CON Control component
M1 First simulator
M2 Second simulator

DETAILED DESCRIPTION OF THE EXAMPLE EMBODIMENTS

An embodiment of the present invention first provides a virtual inverter controller for a nanogrid, wherein the nanogrid comprises at least one parallel branch and at least one branch of the branches is equipped with a protector. At least one of the protectors is equipped with one virtual inverter controller. The virtual inverter controller comprises a sensor component capable of detecting at least one characteristic parameter on the branch, and a control component affecting the electrical connection state of the corresponding protector of the virtual inverter controller according to the characteristic parameter. The sensor component can detect the characteristic parameters such as voltage, current and/or frequency on the branch. By setting the virtual inverter controller comprising the sensor component and the control component, the corresponding protector can be controlled, for example, the protector trips before the inverter starts the protection. Usually, a plurality of branches are equipped in a nanogrid, and each branch is usually equipped with a protector. According to the present invention, a virtual inverter controller can be provided for one or more of these protectors.

According to one preferred embodiment of the present invention, the control component comprises a first simulator, and the first simulator is capable of simulating the protection function of a first inverter on a first branch of the nanogrid and sending a trip signal to the corresponding protector of the virtual inverter controller according to the detected characteristic parameter or the transformation parameter of the characteristic parameter.

According to one preferred embodiment of the present invention, the first simulator calculates a trip time by comparing the characteristic parameter or the transformation parameter of the characteristic parameter with the threshold of the characteristic parameter, and sends a trip signal to the first protector through the control component on the basis of the trip time, wherein the trip time is shorter than the trip protection time of the first inverter. In this way, the corresponding protector of the virtual inverter controller can trip before the inverter starts the protection.

According to another preferred embodiment, the first simulator sends a trip signal to the protector when the value of the characteristic parameter or the transformation parameter of the characteristic parameter exceeds the corresponding protection threshold, wherein the protection threshold is less than the characteristic parameter protection threshold of the first inverter in island mode.

According to one preferred embodiment of the present invention, the control component comprises a second simulator and the second simulator can execute a control algorithm or a simplified control algorithm of a second inverter on a second branch of the nanogrid and output a target characteristic parameter simulating the output of the second inverter, wherein the second simulator compares the target characteristic parameter with a characteristic parameter protection threshold.

Here, it should be pointed out that the control component in the present invention can comprise only a first simulator, or only a second simulator, or both a first simulator and a second simulator, or a plurality of first simulators and/or second simulators. Both the first simulator and the second simulator can be made of hardware, or software only, or both hardware and software. The control component in the present invention can further comprise a memory and a processor. The simulator can be a computer program which is stored in the memory and can run on the processor. The steps realized when the processor executes the program are the simulation and determination steps which are used to realize the protection function, or an algorithm, or a simplified algorithm of an inverter.

According to another preferred embodiment of the present invention, the second simulator calculates a trip time by comparing the characteristic parameter with a characteristic parameter protection threshold, and sends a trip signal to the second protector through the control component on the basis of the trip time, wherein the trip time is shorter than the trip protection time of the second inverter.

According to another preferred embodiment, the second simulator sends a trip signal to the protector when the value of the target characteristic parameter or the transformation parameter of the target characteristic parameter exceeds the corresponding protection threshold, wherein the protection threshold is less than the characteristic parameter protection threshold of the second inverter, especially the characteristic parameter protection threshold of the second inverter in island mode.

According to another preferred embodiment of the present invention, the second simulator determines whether the nanogrid operates in island mode or grid-connected mode according to the value of the target characteristic parameter, wherein, when the target current is in a reasonable range, the nanogrid operates in island mode, and otherwise, the nanogrid operates in grid-connected mode. Thus, the operation mode of a nanogrid can also be determined by setting a virtual inverter controller.

Another embodiment of the present invention provides a nanogrid, wherein the nanogrid comprises at least one parallel branch, at least one branch of the branches being equipped with a protector, and at least one of the protectors being equipped with the virtual inverter controller described in any of the above-mentioned embodiments.

To understand the technical characteristics, objective, and effects of the present invention more clearly, the following describes the embodiments of the present invention in combination with the drawings.

FIG. 1 shows a nanogrid 1 operating in island mode. Such a nanogrid can be a standalone building in actual life, for example, which is equipped with a photovoltaic device PV, a battery storage BA (for example, a battery) and a plurality of electrical appliances or loads LD. In the nanogrid 1 shown in FIG. 1, n parallel branches (not completely shown) are provided. Only four branches 10, 20, 30, 40 are shown, for example. A photovoltaic device PV and a first inverter I11 (or photovoltaic inverter I11), which is connected to the photovoltaic device and can convert DC to AC and output it to the first branch 10, are equipped on the first branch 10. In addition, a first protector 13, which is usually a miniature circuit breaker MCB, is equipped on the first branch 10. Similarly, a battery storage BA, for example, a battery, and a second inverter I21 (also known as battery storage inverter I21) connected to the battery storage are equipped on the second branch 20. In addition, a second protector 23 is equipped on the second branch 20. In addition, there is a third branch 30 in the nanogrid 1. A first load 31 is equipped on the branch, and in addition, a third protector 33 is equipped on the third branch 30. Similarly, there is a fourth branch 40 in the nanogrid 1. A second load 41 is equipped on the branch, and in addition, a fourth protector 43 is equipped on the fourth branch 40. There can be more branches in the nanogrid 1, although they are not shown.

To solve the problem that the whole nanogrid 1 cannot operate because the protection of the inverter on the first branch 10 or second branch 20 is always disconnected before the corresponding miniature circuit breaker MCB in the prior art, the present invention provides a corresponding inverter controller, also known as a virtual inverter controller VIC, for each of the protectors on one or more branches in the nanogrid. The inverter controller can simulate the protection function or working mode (namely, algorithm) of at least one inverter in the nanogrid, and send a trip signal to the corresponding protector of the virtual inverter controller VIC according to the indicative characteristics such as current, and/or voltage, and/or frequency detected on a branch, and part or all of the settings of the inverter before the simulated protection of the inverter takes effect. In this way, the protector trips and the malfunctioning branch is automatically isolated from other branches in the nanogrid, guaranteeing that the whole nanogrid can still operate. Here, virtual does not mean the virtual inverter controller is intangible or is made of software only, that is to say, the virtual inverter controller can be realized by software only, or can comprise corresponding hardware equipment and/or software. In one embodiment of the present invention, the virtual inverter controller VIC is different from the controllers of the inverters in the nanogrid 1.

Figure 2:
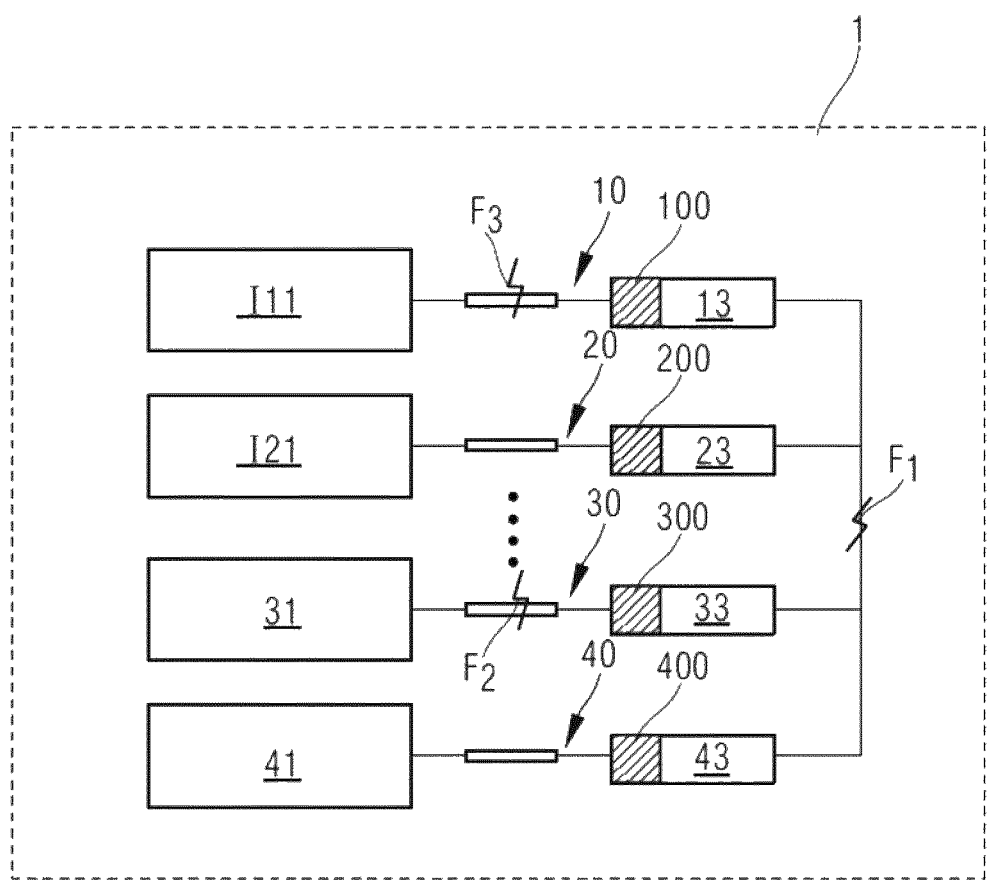
FIG. 2 shows a nanogrid in one embodiment of the present invention.

FIG. 2 shows a nanogrid 1 in one embodiment of the present invention, wherein each protector in the nanogrid is equipped with a virtual inverter controller VIC. In FIG. 2, the first branch 10 is equipped with a first inverter controller 100, which is configured in the first protector 13 or as an accessory of the first protector 13, wherein the first protector 13 can be a miniature circuit breaker MCB. Similarly, the second branch 20 is equipped with a second inverter controller 200, which is configured in the second protector 23 or as an accessory of the first protector 23, wherein the second protector is a miniature circuit breaker MCB. Similarly, the third branch 30 and the fourth branch 40 are equipped with a third inverter controller 300, respectively, which are configured in the third protector 33 and the fourth protector 43 or as accessories of the third protector and fourth protector. If there are more branches, a virtual inverter controller VIC can be provided for the protectors on the branches, respectively, in a similar way. Details are omitted here.

On the one hand according to the present invention, the virtual inverter controller VIC can simulate the protection function of one or more inverters. According to one embodiment of the present invention, the protection functions of an inverter, for example, voltage protection, frequency protection and current limitation, in island mode in the prior art can be realized by configuring a virtual inverter controller VIC in the protector MCB or as an accessory of the protector. This especially applies to the branch equipped with a distributed power supply I11 (namely, photovoltaic device I11 in the embodiment) or a load in the embodiment shown in FIG. 1. According to the present invention, the virtual inverter controller VIC enables the trip time of the protector MCB to be shorter than the response time of the inverter.

For example, in FIG. 2, the first inverter controller 100 can simulate the first inverter I11, and especially the protection and control actions of the first inverter I11. The first inverter I11 can itself start a circuit-breaking operation through the protection functions of characteristic parameters such as current, voltage or frequency. The first virtual inverter controller 100 also realizes this operation, but it is so configured that it always sends a trip signal to the first protector 13 before the protection of the first inverter I11 is executed. Such an operation can be realized by reasonably lowering the thresholds of the characteristic parameters or transformation parameters of the characteristic parameters in the first virtual inverter controller 100.

On the other hand, similarly, the second virtual inverter controller 200 can be realized by simulating the working mode of the second inverter I21, specifically speaking, by simulating the control algorithms or simplified algorithms of the second inverter I21. According to the present invention, for example, if simplified inverter control algorithms are preloaded in the virtual inverter controllers VICs of the second protector I21 and third protector 31, these virtual inverter controllers VICs can distinguish whether a nanogrid operates in grid-connected mode or island mode. Thus, the corresponding protectors of the virtual inverter controllers can distinguish the working mode of the nanogrid.

It should be pointed out that the forms of implementation of the first virtual inverter controller 100 and the second virtual inverter controller 200 are given only for an exemplary purpose. The first virtual inverter controller 100 can simulate the control algorithms of the first inverter, and the second virtual inverter controller 200 can simulate the protection function of the second inverter.

The third virtual inverter controller 300 can realize the working mode of the first inverter I11 or/and the second inverter I21. It should be pointed out that the second virtual inverter controller 200 can also be realized by simulating the inverter, just as the first virtual inverter controller 100 is realized. For example, as shown in FIG. 2, when a malfunction occurs at F1, the whole nanogrid malfunctions. In this case, there is no demand for a response.

The protection modes or algorithms or simplified algorithms of the first inverter I11 and the second inverter I21 can simultaneously or respectively be preloaded in the virtual inverter controller 300 of the third protector 33 on the third branch 30. When a malfunction occurs at F2, the third protector 33 responds quicker than the inverter on the first branch and the inverter I21 on the second branch 20 so that the third protector 33 trips earlier than the first protector 13, the second protector 23 and the inverters I11 and I21. Thus, the protection of the whole nanogrid is realized.

The reverse overcurrent protection of the inverter and the protection of the inverter can be preset and simulated in the corresponding virtual inverter controller 100 of the first protector 13. Therefore, when a malfunction occurs at F3, the first protector I11 can trip ahead of the second protector 23 and the battery storage inverter I21, thus realizing the protection of the whole nanogrid.

Figure 3:
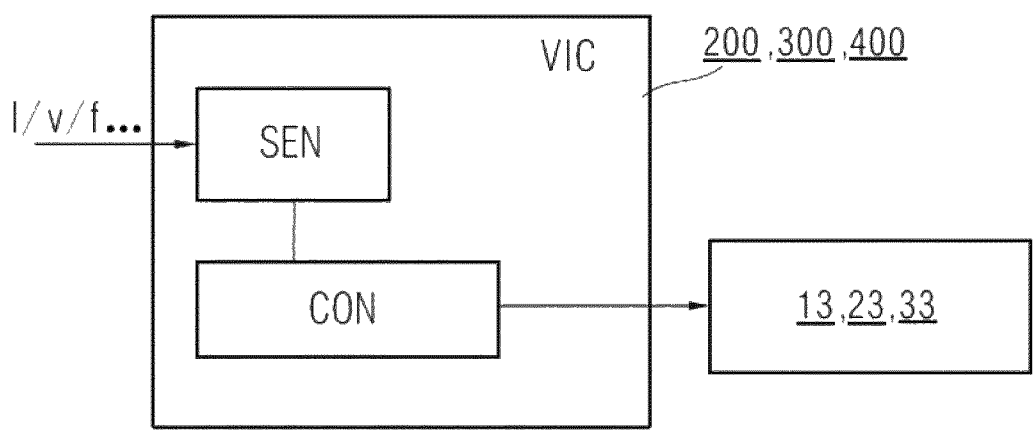
FIG. 3 shows a virtual inverter controller in the embodiments of the present invention.

FIG. 3 further shows the specific form of implementation of a virtual inverter controller VIC in the embodiments of the present invention. To realize the function of a virtual inverter controller VIC, the virtual inverter controller VIC comprises a sensor component SEN capable of detecting or monitoring the characteristic parameters such as voltage and/or current on the branch where the virtual inverter controller VIC is located. The sensor component SEN sends the detected characteristic parameters such as voltage, current or frequency, or their transformation parameters to a control component CON for processing. The control component 230 can comprise one or two of the following two different simulators or simulation modes to realize the simulation of at least one simulator:

First simulator or first simulation mode: Simulating the protection action and control function (also known as protection function) of a simulator, and comparing the measured characteristic parameters such as voltage and/or current and/or sampling frequency, or the transformation parameters of the characteristic parameters with the preset thresholds of the characteristic parameters such as voltage, current and frequency, and sending a trip signal to the protector on the branch when a threshold is exceeded so that the protector trips before the inverter responds, or Second simulator or second simulation mode: Simulating the control algorithms of a simulator or executing the simplified control algorithms of the simulator, especially when the virtual inverter controller VIC is located on a branch equipped with a battery storage, and executing the simplified control algorithms of the simulated inverter in the control component CON based on the sampling frequency, for example, so that the protector of the virtual inverter controller containing the simulator can simulate the output actions of the inverter. In such a setting mode of the simulator, the current and voltage detected by the virtual inverter controller can also be analyzed as fast as possible so that a malfunction occurring in the nanogrid can be found.

It should be pointed out that the simulators can be realized through a special processing or control device, for example, a field programmable gate array FPGA or a programmable logic controller PLC, or through pure software which runs on a general processing or control device such as a processing unit (CPU).

The control component CON in the present invention can further comprise a memory and the above-mentioned processor. The simulator can be a computer program which is stored in the memory and can run on the processor. The steps realized when the processor executes the program are the simulation and determination steps which are used to realize the protection functions, or algorithms, or simplified algorithms of an inverter.

Generally speaking, a virtual inverter controller VIC can simulate the protection functions or control algorithms of an actual inverter. For the specific forms of implementation, see the examples in FIG. 4 and FIG. 5.

Figure 4:
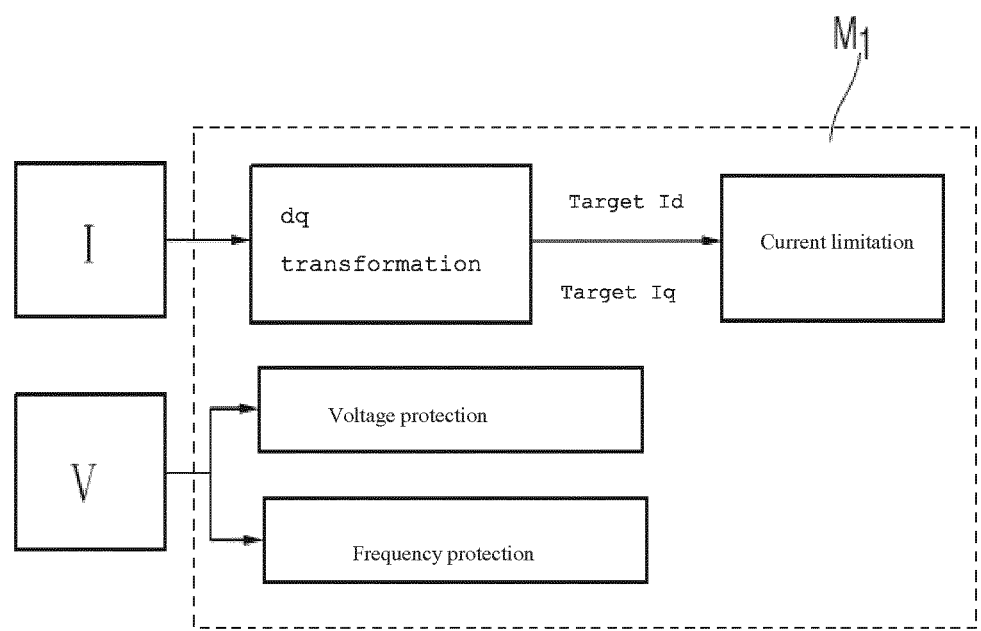
FIG. 4 shows a procedure executed by a simulator in the control component of a virtual inverter controller in the embodiments of the present invention.

First, see FIG. 4 and take the first branch 100 as an example. Since a distributed power supply, for example, a photovoltaic device PV, is arranged on the first branch, the branch is also called a slave path. The first virtual inverter controller 100 provided for the protector 13 on the slave path is based on the PQ control algorithm P=V*I. A first simulator M1 is arranged in the control component 230, and the first simulator can realize the protection functions of the first inverter I11, including current limitation, voltage display and frequency protection. The first simulator can execute the following procedure:

Perform a dq transformation for the current IABC detected by the sensor component I210 or directly compare the detected current IABC and/or voltage VABC with the protection threshold of the first inverter I11 in island mode to determine the trip time of the protector. According to the present invention, the control component 230 sending a trip signal to the first protector based on the calculated trip time enables the first protector to trip.

Or the first simulator M1 can execute the following procedure:

Perform a dq transformation for the current IABC detected by the sensor component I210 to obtain the target current, or directly compare the detected current IABC as the target current and/or the detected voltage VABC as the target voltage with the current thresholds and/or voltage thresholds of the first inverter I11 in island mode, and notify the first virtual inverter controller 100 of sending a trip signal to the corresponding first protector 13 when the target current Id/Iq is above one of the current protection thresholds or the target voltage is above one of the voltage protection thresholds. The target current protection threshold can be set to be less than the current protection threshold of the first inverter I11 in island mode so that the first protector 13 can wholly disconnect the first branch before the first inverter I11 disconnects the first branch.

In addition, through the first virtual inverter controller 100, the first protector can further determine the working mode of the nanogrid 1. For example, the first protector determines the working mode when the first virtual inverter controller 100 senses a fault current and/or voltage, wherein a fault current and/or voltage causes the voltage to drop by a percentage, for example, 3%, after the fault occurs.

Through the above-mentioned virtual inverter controller, the protectors can make analyses according to the received output of the virtual inverter controller, and thus determine their own protection settings when the working mode of the nanogrid 1 is not input.

Figure 5:
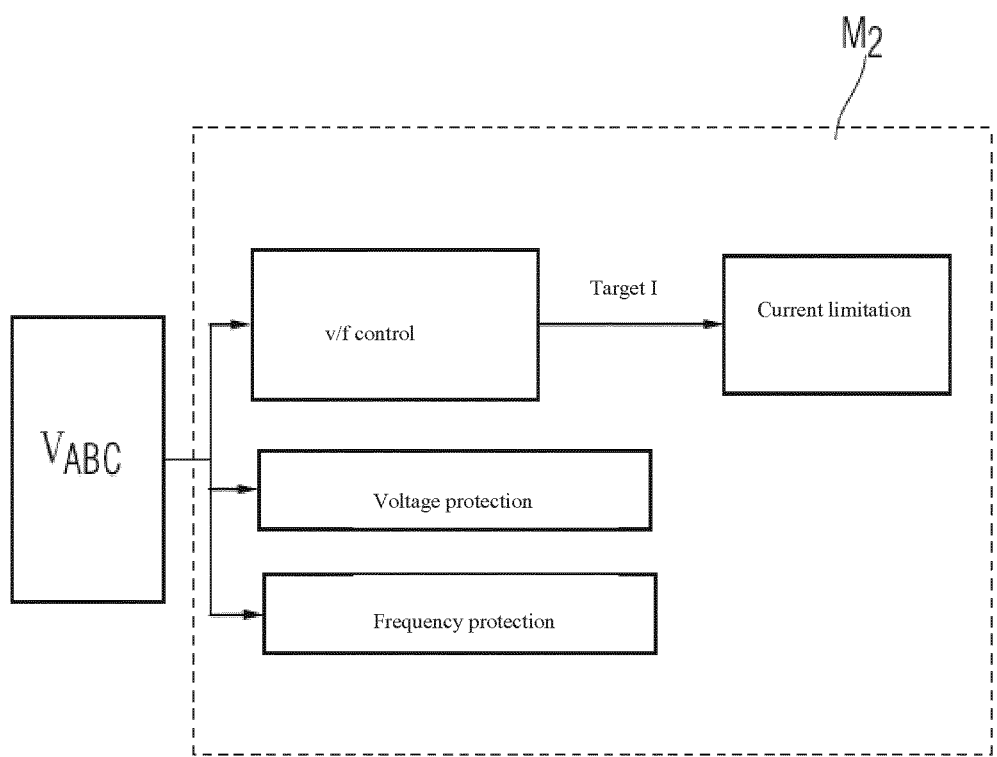
FIG. 5 shows another procedure executed by a simulator in the control component of a virtual inverter controller in the embodiments of the present invention.

In the second simulation mode, the second branch 20 is described as an example. As shown in FIG. 5, a battery or battery storage I21 is provided on the second branch 20, and in this case, the second branch can be called a master path I21 in the nanogrid 1. In the embodiment, the inverter on the master path or the second inverter I21 is based on V/f control (voltage/frequency control). Therefore, the sensor component I210 of the second virtual inverter controller 200, also known as inverter controller 200 on the master path, can monitor the voltage on the master path. A simulator M2 in the control component 230 is also based on V/f control and can simulate the working of the second inverter I21. The simulator simulates the current output of the second inverter I21 by monitoring the voltage on the second branch 20, wherein such a simulation is realized on the basis of the fact that the second simulator M2 in the second virtual inverter controller 200 itself executes the simplified algorithms and protection functions of the second inverter I21. For a simplified algorithm, for example, V/f control, the second simulator performs the following procedure:

Process the voltage VABC sensed by the sensor component and input to the control component, and output and simulate the target current of the second inverter's I21 current output through the voltage control outer loop of the V/f controller.

Compare the target current with a target current protection threshold to determine the trip time of the protector. Notify the second virtual inverter controller 200 of sending a trip signal to the corresponding second protector 23 when the target current Id/Iq is greater than the current protection threshold. The target current protection threshold can be set to be less than the current protection threshold of the second inverter I21 in island mode so that the second protector 23 can wholly disconnect the second branch before the second inverter I21 disconnects the second branch. Alternatively, the trip time can directly be set to be shorter than the trip time of the second inverter I21.

In addition, the second protector equipped with a second virtual inverter controller 200 can further determine whether the nanogrid 1 where the second protector is located is in island mode or grid-connected mode according to the target current output by the second virtual inverter controller 200. For example, when the target current is in a reasonable range, the nanogrid 1 is in island mode, and otherwise in grid-connected mode.

For the third branch 30 and fourth branch 40 equipped with a load, a third virtual inverter controller 300 can be provided respectively. To guarantee the working of the third branch 30 and the fourth branch 40, the control component of the third virtual inverter controller 300 can comprise the first simulator M1, or the second simulator M2, or both the first simulator M1 and the second simulator M2 in the above-mentioned embodiments so that the corresponding protector can trip to protect the branches before any inverter starts its protector.

As expected, in a nanogrid equipped with more branches, the protectors on the branches to be protected can be equipped with a virtual inverter controller, respectively, and the control component in the virtual inverter controller can comprise one, two or more simulators, wherein each simulator can simulate the protection functions or algorithms of an inverter.

It should be understood that although the Description gives a description according to embodiments, it does not mean that each embodiment contains only one independent technical solution. The description method in the Description is only for the sake of clarity. Those skilled in the art should consider the Description as an integral body. The technical solutions in all these embodiments can be combined properly to form other embodiments that those skilled in the art can understand.

The above are only exemplary embodiments of the present invention but are not used to limit the scope of the present invention. All equivalent variations, modifications, or combinations made by any of those skilled in the art without departing from the conception and principle of the present invention should fall within the scope of protection of the present invention.

The invention claimed is:

1. A virtual inverter controller for a nanogrid, the nanogrid including at least one parallel branch each being equipped with a respective protector, and each protector being equipped with a virtual inverter controller, the virtual inverter controller comprising:
    a sensor component, configured to detect at least one characteristic parameter on the at least one parallel branch; and
    a control component, configured to affect an electrical connection state of a corresponding protector of the virtual inverter controller according to the at least one characteristic parameter,
    wherein the control component includes a first simulator, the first simulator being configured to simulate the protection function of a first inverter on a first branch of the nanogrid and being configured to send a trip signal to a corresponding protector of the virtual inverter controller according to the at least one characteristic parameter or a transformation parameter of the at least one characteristic parameter, and
    wherein the first simulator is configured to calculate a trip time by comparing the at least one characteristic parameter or the transformation parameter of the at least one characteristic parameter with a threshold of the at least one characteristic parameter, and is configured to send a trip signal to the respective protector through the control component based upon the trip time, the trip time being shorter than a trip protection time of the first inverter, and wherein the respective protector activates a trip when the trip signal is received.

2. The virtual inverter controller of claim 1, wherein the first simulator is configured to send a trip signal to the respective protector upon the value of the characteristic parameter or the transformation parameter of the characteristic parameter exceeding a corresponding protection threshold, the protection threshold being less than a characteristic parameter protection threshold of the first inverter in island mode.

3. The virtual inverter controller of claim 1, wherein the control component includes a second simulator and the second simulator is configured to
    execute a control algorithm or simplified control algorithm of a second inverter on a second branch of the nanogrid, and
    output to the corresponding protector of the virtual inverter controller, a target characteristic parameter simulating the output of the second inverter,
    wherein the second simulator is configured to compare the target characteristic parameter with a characteristic parameter protection threshold.

4. The virtual inverter controller of claim 3, wherein the second simulator is configured to
    compare the target characteristic parameter with a characteristic parameter protection threshold and calculate the trip time, and
    send a trip signal to the corresponding protector through the control component based upon the trip time, the trip time being shorter than the trip protection time of the second inverter.

5. The virtual inverter controller of claim 3, wherein the second simulator is configured to
    send a trip signal to the protector upon the value of the target characteristic parameter or a transformation parameter of the target characteristic parameter exceeding a corresponding protection threshold, the corresponding protection threshold being less than the characteristic parameter protection threshold of the second inverter.

6. The virtual inverter of claim 3, wherein the second simulator is configured to determine whether the nanogrid operates in island mode or grid-connected mode according to the value of the target characteristic parameter, wherein, upon the target current being in a reasonable range, the nanogrid is configured to operate in island mode, and upon the target current not being in the reasonable range, the nanogrid is configured to operate in grid-connected mode.

7. A nanogrid, comprising:
    at least one parallel branch, at least one branch of the at least one parallel branch being equipped with a protector, at least one protector being equipped with the virtual inverter controller of claim 1.

8. The virtual inverter controller of claim 1, wherein the control component includes a second simulator and the second simulator is configured to execute a control algorithm or simplified control algorithm of a second inverter on a second branch of the nanogrid, and output to the corresponding protector of the virtual inverter controller, a target characteristic parameter simulating the output of the second inverter, wherein the second simulator is configured to compare the target characteristic parameter with a characteristic parameter protection threshold.

9. The virtual inverter of claim 4, wherein the second simulator is configured to determine whether the nanogrid operates in island mode or grid-connected mode according to the value of the target characteristic parameter, wherein, upon the target current being in a reasonable range, the nanogrid is configured to operate in island mode, and upon the target current not being in the reasonable range, the nanogrid is configured to operate in grid-connected mode.

10. The virtual inverter of claim 5, wherein the second simulator is configured to determine whether the nanogrid operates in island mode or grid-connected mode according to the value of the target characteristic parameter, wherein, upon the target current being in a reasonable range, the nanogrid is configured to operate in island mode, and upon the target current not being in the reasonable range, the nanogrid is configured to operate in grid-connected mode.

11. The virtual inverter controller of claim 8, wherein the second simulator is configured to compare the target characteristic parameter with a characteristic parameter protection threshold and calculate the trip time, and send a trip signal to the corresponding protector through the control component based upon the trip time, the trip time being shorter than the trip protection time of the second inverter.

12. The virtual inverter controller of claim 8, wherein the second simulator is configured to send a trip signal to the protector upon the value of the target characteristic parameter or the transformation parameter of the target characteristic parameter exceeding a corresponding protection threshold, the corresponding protection threshold being less than the characteristic parameter protection threshold of the second inverter.

13. The virtual inverter controller of claim 2, wherein the control component includes a second simulator and the second simulator is configured to execute a control algorithm or simplified control algorithm of a second inverter on a second branch of the nanogrid, and output to the corresponding protector of the virtual inverter controller, a target characteristic parameter simulating the output of the second inverter, wherein the second simulator is configured to compare the target characteristic parameter with a characteristic parameter protection threshold.

14. The virtual inverter controller of claim 13, wherein the second simulator is configured to compare the target characteristic parameter with a characteristic parameter protection threshold and calculate the trip time, and send a trip signal to the corresponding protector through the control component based upon the trip time, the trip time being shorter than the trip protection time of the second inverter.

* * * * *